United States Patent Office 3,256,367
Patented June 14, 1966

3,256,367
POLYPROPYLENE COMPOSITIONS HAVING IMPROVED IMPACT STRENGTH CONTAINING POLYETHYLENE AND ETHYLENE-PROPYLENE COPOLYMER
William M. Jayne, Jr., Basking Ridge, N.J., assignor to Union Carbide Corporation, a corporation of New York
No Drawing. Filed Aug. 14, 1962, Ser. No. 216,727
5 Claims. (Cl. 260—897)

The invention relates to novel polypropylene compositions. More particularly, the invention relates to novel compositions comprising polypropylene, polyethylene, and ethylene/propylene copolymers or polyisobutylene which exhibit surprisingly improved impact strength.

Solid polypropylene is recognized in the plastics industry as possessing great commerical potential because it is superior in several respects to polyethylene. For example, polypropylene has a higher melting point, lower density, and greater stiffness modulus than does polyethylene. Polypropylene can also be produced in either amorphous or crystalline form by variation of the polymerization catalyst.

Polypropylene has been used for the manufacture of shaped articles, but some of its inherent deficiencies have, unfortunately, limited its use in many other applications for which it would otherwise be well suited. For example, its low impact strength, i.e., high shock sensitivity at temperatures below room temperature, is a disadvantage which has precluded its use for fibers, films, and other extruded and molded items, and, in particular, for containers and packaging materials.

In order to remedy the low impact resistance possessed by polypropylene, rubber products, such as polyisobutylene, have been added. While addition of rubbers has resulted in polypropylene compositions having improved impact resistance, the improvement has been achieved at the expense of obtaining a more opaque product having less stiffness, i.e., a lower secant modulus, and lower heat and air stability than unmodified polypropylene.

Thus there exists in the art a need for polypropylene having, particularly, higher impact strength than is available with presently known polypropylene-rubber compositions.

It has now been surprisingly discovered that polypropylene compositions having higher impact strengths and stiffness and heat resistance properties comparable to any polypropylene or rubber-modified polypropylene heretofore available are obtained by the incorporation of a polyethylene having a density above about 0.91 into polypropylene-rubber compositions comprising a polypropylene having a density above about 0.89 and amorphous ethylene/propylene copolymer or polyisobutylene rubber.

It is an unusual phenomenon in the present invention that the improvement in polypropylene impact strength is realized only when the polyethylene is incorporated into polypropylene compositions containing either an amorphous ethylene-propylene copolymer rubber or polyisobutylene rubber. When other rubbers conventionally employed as additives in polypropylene, for example, polybutadiene and polyisoprene, are blended with polypropylene with or without polyethylene, the compositions do not exhibit the surprising great impact strength improvement found with the compositions of the present invention.

The polypropylene compositions of the invention generally comprise from about 50 percent by weight to about 96 percent by weight polypropylene, from about 2 percent by weight to about 25 percent by weight polyethylene, and from about 2 percent by weight to about 25 percent by weight amorphous ethylene/propylene copolymer or polyisobutylene. Preferred polypropylene compositions comprise from about 65 to about 92 percent by weight polypropylene, from about 4 percent by weight to about 20 percent by weight polyethylene, and from about 4 percent by weight to about 15 percent by weight amorphous ethylene/propylene copolymer or polyisobutylene. The combined amount of polyethylene and amorphous ethylene/propylene copolymer or polyisobutylene in any polypropylene composition is preferably less than 35 percent by weight because of the desirable flexural characteristics of such mixtures.

The polypropylenes useful in the compositions of this invention are normally solid polymers of propylene having a melt flow at 44 p.s.i. and 230° C. below about 12 g./10 min. and preferably from about 2.0 to about 0.01 g./10 min. While the density of the polypropylene used is not particularly critical, polypropylenes having a density above about 0.89 g./cc. are generally preferred. The polypropylene can be either amorphous or crystalline or partially crystalline.

Polyethylenes found to impart unexpected improvement in impact strength to polypropylene-rubber compositions are those normally solid polymers having a density of from about 0.91 to about 0.97 and higher and a melt index at 190° C. and 44 p.s.i. below about 100 dg./min. and particularly from about 1.0 to about 8.0 dg./min. The preferred density is about 0.96.

It has been found that only two rubbers, namely amorphous ethylene/propylene copolymers and polyisobutylene, can be used in admixture with polypropylene and polyethylene to secure the improvements and advantages of the compositions of this invention. Of these two, amorphous ethylene/propylene copolymers are preferred because greater impact strengths are obtained with lesser sacrifice of stiffness and oxygen and thermal stability. Amorphous ethylene/propylene copolymers are useful over a wide range of combined ethylene to combined propylene ratios, e.g., from about 25 percent by weight to about 95 percent by weight combined ethylene and from about 5 percent by weight to about 75 percent by weight combined propylene. The preferred amorphous ethylene/propylene copolymers comprise from about 35 percent by weight to about 80 percent by weight combined ethylene and from about 20 percent by weight to about 65 percent by weight combined propylene. The ethylene/propylene copolymers employed herein are normally solid copolymers having a melt index at 190° C. and 44 p.s.i. of less than about 1000 dg./min. and preferably less than about 100 dg./min.

By the term amorphous ethylene/propylene copolymers is meant those ethylene/propylene copolymers which are less than about 20 percent crystalline. The preferred ethylene/propylene copolymers are completely non-crystalline.

The polyisobutylenes employed herein have a melt index at 190° C. and 44 p.s.i. of less than about 1,000 dg./min. and preferably less than about 100 dg./min.

The three components of the composition herein described can be mixed together in any order using conventional hot processing equipment well known to the plastics art. For example, batch type equipment such as a Banbury mixer or a two-roll mill can be employed, or a finely ground mixture can be compounded in a screw extruder.

Masterbatch techniques are conveniently employed in preparing the mixtures. For example, if it is desired to prepare a polypropylene composition containing 10 percent by weight ethylene/propylene copolymer and 10 percent by weight polyethylene, a masterbatch of ethylene/ propylene copolymer and polyethylene is first prepared which contains equal weight amounts of these components. Subsequent letdown of the masterbatch at 4 parts by weight polypropylene to 1 part by weight masterbatch, e.g., in a Banbury mixer or a screw extruder produces a mixture containing 80 percent by weight polypropylene and 10 percent by weight each of ethylene/ propylene copolymer and polyethylene.

The compositions of this invention, as other thermoplastic compositions, can contain stabilizers, antioxidants, colorants, processing aids, pigments, and other additives if desired, in normal and conventional amounts.

The polypropylene compositions of this invention can be used to produce films, filaments, rods, protective coatings, molded and extruded shaped articles, and the like, by procedures known in the art. These compositions form products which are particularly useful where low temperatures and shock are likely to be encountered.

The following descriptions and examples illustrate the invention and should not be construed as limitative thereof. Unless otherwise indicated all parts and percentages are by weight.

EXAMPLES 1-4

A polyethylene-ethylene/propylene copolymer masterbatch was prepared as follows. Thirteen pounds of amorphous ethylene/propylene copolymer having a Mooney viscosity range of from 35 to 49 and containing about 48 percent by weight (about 58 mole percent) combined ethylene and about 52 percent by weight (about 42 mole percent) combined propylene and thirteen pounds of polyethylene having a density of about 0.96 and a melt index of about 5.0 were charged into a Banbury mixer. The ethylene/propylene copolymer was added as small chunks and the polyethylene as 1/16 inch spherical beads. The two components were blended for an eight minute cycle at 150° C. and then transferred to the rolls of two-roll mill for 5 minutes, including 5 end passes before sheeting and cutting into squares approximately 4" x 4" x 3/16". These squares were fed into a Cumberland 7 x 10 inch plastic grinder to produce a masterbatch in the form of 1/4" x 3/8" bits.

In Examples 1-4 an amount of masterbatch calculated to provide the desired amount of polyethylene and ethylene/propylene copolymer, as indicated in Table I following, was mixed with the corresponding amount of polypropylene. The method of Example 1 is representative of the method employed in each of the following examples and was as follows. Ten pounds of the masterbatch was added to 90 pounds of a 1.4 melt flow polypropylene having a density of 0.915 contained in a 40-gallon fiber drum. The drum was rolled at 50 r.p.m. for 20 minutes to intermix the masterbatch and polypropylene pellets.

A two-inch screw extruder was used to compound the pellet mixture, using an extrusion temperature of 230–250° C., and to produce strand cut pellets suitable for molding. The extruded strands were passed through a 40° C. cooling water bath, dried, and cut into approximately 3/16" x 3/16" pellets. The mixture had the following composition: 90 percent by weight polypropylene, 5 percent by weight polyethylene, and 5 percent by weight ethylene/propylene copolymer.

Test pieces, 1/8" x 1/2" x 8" tensile bars were produced on an injection molding machine at 140° F. mold temperature and 700 p.s.i. The test pieces were conditioned for a minimum of 40 hours at 23° C. and 50 percent relative humidity prior to testing.

The following tests were conducted.

| Test for: | ASTM number |
|---|---|
| Tensile yield strength | D638 @ 20"/min. |
| Secant modulus | D638 @ 0.2"/min. using a 4" span. |
| Melt index and melt flow (melt flow is used for polypropylene and polypropylene mixtures) | D1238–57T @ 44 p.s.i. and 230° C. for polypropylene; @ 44 p.s.i. and 190° C. for polyethylene, polyisobutylene, and ethylene/propylene copolymer. |
| Izod impact strength | D256–56 using 1/8" specimens @ 23° C. and 0° C. |

In Table I data is presented for Examples 1–4 and for seven control experiments in which either (A) no polyethylene and no ethylene/propylene copolymer was used to modify a 1.4 melt index polypropylene (Control 1); (B) only polyethylene was added to the polypropylene (Controls 2–5); (C) only ethylene/propylene copolymer was added to the polypropylene (Controls 6–7).

It can be seen from the data collected for Examples 1–4, which contained both polyethylene and ethylene/propylene copolymer as modifiers in accordance with this invention, that a great increase in Izod impact strength and a decrease in tensile yield strength is attained over the control samples.

Melt index is measured in decigrams per minute (dg./min.) and melt flow is measured in grams per 10 minutes (g./10 min.).

Table I

| Example Number | Percent by Weight Polypropylene Melt Flow=1.4 | Percent by Weight Polyethylene Melt Index=5 Density=0.96 | Percent by Weight Ethylene/ Propylene Copolymer a | Tensile Yield Strength p.s.i. | Secant Modulus p.s.i. | Izod Impact Strength | | Melt Flow g./10 min. |
|---|---|---|---|---|---|---|---|---|
| | | | | | | 23° C. | 0° C. | |
| Control 1 | 100 | 0 | 0 | 5,000 | 210,000 | 0.40 | 0.37 | 1.4 |
| Control 2 | 95 | 5 | 0 | 5,000 | 191,000 | 0.87 | -------- | -------- |
| Control 3 | 90 | 10 | 0 | 5,260 | 207,000 | 0.75 | 0.44 | 1.7 |
| Control 4 | 85 | 15 | 0 | 5,200 | 197,000 | 0.81 | -------- | -------- |
| Control 5 | 75 | 25 | 0 | 5,000 | 201,000 | 0.77 | -------- | 1.8 |
| Control 6 | 95 | 0 | 5 | 4,560 | 176,000 | 0.97 | 0.57 | 1.4 |
| Control 7 | 90 | 0 | 10 | 4,100 | 151,000 | 2.10 | 0.63 | 1.4 |
| 1 | 90 | 5 | 5 | 4,800 | 171,000 | 2.17 | 0.62 | 1.0 |
| 2 | 80 | 10 | 10 | 4,300 | 157,000 | 8.6 | 2.00 | 1.2 |
| 3 | 70 | 15 | 15 | 3,500 | 125,000 | 10.0 | 5.10 | 2.0 |
| 4 | 70 | 20 | 10 | 3,800 | 141,000 | 9.7 | 1.20 | 2.1 | a About 48 percent by weight combined ethylene; melt index=2.5; specific gravity=0.86; Mooney viscosity at 212° F=35 to 49.

EXAMPLE 5

The procedure of Example 1 was followed except that polyisobutylene was used. In Table II there is presented data for an experiment in which only polyethylene is used to modify the polypropylene (Control 8) and Example 5 in which both polyethylene and polyisobutylene are used as modifiers. The tensile yield strength and secant modulus of the control and the example are identical within experimental error but the Izod impact strength at 23° C. of the example has been doubled, from 3.00 to 6.00.

Table II

| Example Number | Percent by Weight Polypropylene, Melt Flow=1.4 | Percent by Weight Polyethylene: Melt Idnex=5, Density=0.96 | Percent by Weight Polyisobutylene, Melt Index=0.08 | Tensile Yield Strength, p.s.i. | Secant Modulus, p.s.i. | Izod Impact Strength 23° C. | Izod Impact Strength 0° C. | Melt Flow, g./10 min. |
|---|---|---|---|---|---|---|---|---|
| Control 8 | 85 | 0 | 15 | 3,800 | 146,000 | 3.00 | 0.85 | 1.42 |
| Example 5 | 70 | 15 | 15 | 3,500 | 141,000 | 6.00 | 0.70 | 1.70 |

EXAMPLES 6–7

The procedure of Example 1 was followed except that 4.0 melt flow polypropylene was use.

In Table III there is presented data for Examples 6–7 and for seven control experiments in which either (A) no polyethylene and no ethylene/propylene copolymer was used to modify the 4.0 melt flow polypropylene (Control 9); (B) only polyethylene was added to polypropylene (Controls 10–13); (C) only ethylene/propylene copolymer was added to polypropylene (Controls 14–15). It can be seen from the data of Examples 6–7, which contained both polyethylene and ethylene/propylene copolymer as modifiers in accordance with this invention, that a significant increase in the Izod impact strength at both 23° C. and 0° C. and decrease in tensile yield strength is attained over the control samples.

EXAMPLES 8–10

The procedure of Example 1 was followed except that the ethylene/propylene copolymers used were partially crystalline (5–20 percent) and contained 16 percent by weight combined propylene (Example 8); 66 percent by weight combined propylene (Example 9); or 34 percent by weight combined propylene (Example 10).

It can be seen from the data recorded in Table V that when an ethylene/propylene copolymer containing 66 percent by weight combined propylene, even though partially crystalline, is used (Example 9), a great increase in impact strength at 23° C. results over the control (Control 22) containing the same ethylene/propylene copolymer and polypropylene but no polyethylene. When lower amounts of combined propylene are present in the ethylene/propylene copolymer (Examples 8 and 10) the impact

Table III

| Example Number | Percent by Weight Polypropylene Melt Flow=1.4 | Percent by Weight Polyethylene Melt Index=5 Density=0.96 | Percent by Weight Ethylene/Propylene Copolymer a | Tensile Yield Strength p.s.i. | Secant Modulus p.s.i. | Izod Impact Strength 23° C. | Izod Impact Strength 0° C. | Melt Flow g./10 min. |
|---|---|---|---|---|---|---|---|---|
| Control 9 | 100 | 0 | 0 | 4,900 | 205,000 | 0.40 | 0.37 | 4.1 |
| Control 10 | 95 | 5 | 0 | 5,050 | 185,000 | 0.58 | 0.36 | 4.3 |
| Control 11 | 90 | 10 | 0 | 4,900 | 195,000 | 0.61 | 0.45 | 4.7 |
| Control 12 | 85 | 15 | 0 | 5,000 | 186,000 | 0.63 | --- | --- |
| Control 13 | 75 | 25 | 0 | 4,950 | 187,000 | 0.60 | --- | 5.4 |
| Control 14 | 90 | 0 | 10 | 4,000 | 161,000 | 1.44 | 0.58 | 3.1 |
| Contro 15 | 85 | 0 | 15 | 3,500 | 130,000 | 2.00 | 0.88 | 3.45 |
| 6 | 80 | 10 | 10 | 4,300 | 155,000 | 3.86 | 1.00 | 2.9 |
| 7 | 75 | 10 | 15 | 3,400 | 127,000 | 5.10 | 1.20 | --- | a About 48 percent by weight combined ethylene; melt index=2.5; specific gravity=0.86; Mooney viscosity at 212° F.=35 to 49.

CONTROLS 16–20

The procedure of Example 1 was followed except that polyisoprene (Controls 16–17) and polybutadiene (Controls 18–20) were used as the rubber. Surprisingly, these rubbers are not effective in increasing the Izod impact strength of the mixtures. Data for these controls are presented in Table IV.

strength is approximately the same (Example 8 at 23° C. and Example 10 at 0° C.) or higher (Example 8 at 0° C. and Example 10 at 23° C.). In Example 9 tensile yield strength has decreased.

What is claimed is:

1. Polypropylene composition having high impact strength which comprises from about 50 to about 96 per-

Table IV

| Experiment | Percent by Weight Polypropylene Melt Flow=4.0 | Percent by Weight Polyethylene Melt Index=5 Density=0.96 | Percent by Weight Polyisoprene Melt Index=0.01 | Percent by Weight Polybutadiene Melt Index=0.01 | Tensile Yield Strength p.s.i. | Secant Modulus, p.s.i. | Izod Impact Strength 23° C. | Izod Impact Strength 0° C. |
|---|---|---|---|---|---|---|---|---|
| Control 16 | 90 | 0 | 10 | 0 | 3,870 | 157,000 | 1.3 | 0.41 |
| Control 17 | 80 | 10 | 10 | 0 | 3,330 | 145,000 | 1.4 | 0.44 |
| Control 18 | 90 | 0 | 0 | 10 | 4,200 | 158,000 | 1.5 | 0.65 |
| Control 19 | 90 | 5 | 0 | 5 | 4,380 | 160,000 | 1.04 | 0.67 |
| Control 20 | 75 | 15 | 0 | 10 | 4,110 | 160,000 | 1.17 | 0.72 |

Table V

| Example Number | Percent by Weight Polypropylene Melt Flow=1.4 | Percent by Weight Polyethylene Melt Index=5 Density=0.96 | Percent by Weight Ethylene/Propylene Copolymer a | Tensile Yield Strength, p.s.i. | Secant Modulus, p.s.i. | Izod Impact Strength 23° C. | Izod Impact Strength 0° C. | Melt Flow g./10 min. |
|---|---|---|---|---|---|---|---|---|
| Control 21 | 90 | 0 | 10 | 4,390 | 174,000 | 1.15 | 0.27 | 1.02 |
| 8 | 80 | 10 | 10 | 4,685 | 184,400 | 1.17 | 0.55 | 1.20 |
| Control 22 | 90 | 0 | 10 | 4,315 | 163,100 | 1.67 | 0.46 | 1.12 |
| 9 | 80 | 10 | 10 | 4,265 | 167,300 | 2.41 | 0.45 | 1.46 |
| Control 23 | 90 | 0 | 10 | 4,350 | 168,800 | 1.54 | 0.55 | 1.06 |
| 10 | 80 | 10 | 10 | 4,430 | 175,300 | 1.89 | 0.49 | 1.09 | a Example 8: 16 percent by weight combined propylene; 84 percent by weight combined ethylene.
Example 9: 66 percent by weight combined propylene; 34 percent by weight combined ethylene.
Example 10: 34 percent by weight combined propylene; 66 percent by weight combined ethylene.

cent by weight of a normally solid polypropylene having a melt flow of less than about 12 g./10 min., from about 2 to about 25 percent by weight of polyethylene having a density of at least about 0.91 and a melt index of less than about 100 dg./min., and from about 2 to about 25 percent by weight of amorphous ethylene/propylene copolymer containing from about 5 to about 75 percent by weight of combined ethylene and from about 25 to about 95 percent by weight of combined propylene and having a melt index of less than about 1000 dg./min.

2. Polypropylene composition as claimed in claim 1 wherein the combined amount of polyethylene and amorphous ethylene/propylene copolymer is less than 35 percent by weight.

3. Polypropylene composition as claimed in claim 1 wherein said polypropylene has a melt flow of from about 0.1 g./10 min. to about 2.0 g./10 min., said polyethylene has a melt index of from about 1.0 dg./min. to about 8 dg./min. and said amorphous ethylene/propylene copolymer has a melt index of less than about 100 dg./min.

4. Polypropylene composition as claimed in claim 3 wherein the combined amount of polyethylene and ethylene/propylene copolymer in said polypropylene composition is less than 35 percent by weight.

5. Polypropylene composition having high impact strength which comprises from about 65 to about 92 percent by weight of a normally solid polypropylene having a melt flow of from about 0.1 g./10 min. to about 2.0 g./10 min., from about 4 to about 20 percent by weight of polyethylene having a density of about 0.96 and a melt index of from about 1.0 dg./min. to about 8.0 dg./min. and from about 4 to about 15 percent by weight of ethylene/propylene copolymer having a melt index of less than about 100 dg./min. and containing from about 35 to about 80 percent by weight of combined ethylene and from about 20 to about 65 percent by weight of combined propylene.

References Cited by the Examiner

UNITED STATES PATENTS 2,993,028　7/1961　Ranalli _____ 260—897
3,036,987　5/1962　Ranalli _____ 260—897

MURRAY TILLMAN, *Primary Examiner.*
LEON J. BERCOVITZ, *Examiner.*